US008928391B2

(12) United States Patent
Naaman et al.

(10) Patent No.: US 8,928,391 B2
(45) Date of Patent: Jan. 6, 2015

(54) CONTROLLING A STATE OF A QUBIT ASSEMBLY

(75) Inventors: Ofer Naaman, Ellicott City, MD (US); Anna Y. Herr, Ellicott City, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 831 days.

(21) Appl. No.: 13/177,690

(22) Filed: Jul. 7, 2011

(65) Prior Publication Data

US 2013/0009677 A1    Jan. 10, 2013

(51) Int. Cl.
*H03K 17/92*    (2006.01)
*G06N 99/00*    (2010.01)

(52) U.S. Cl.
CPC .................. *G06N 99/002* (2013.01)
USPC .......................... 327/367; 327/528

(58) Field of Classification Search
CPC ....... B82Y 10/00; G06N 99/002; H03K 17/92
USPC ................. 327/366, 367, 527, 528
See application file for complete search history.

(56) References Cited

U.S. PATENT DOCUMENTS

| 2,656,513 | A | 10/1953 | King |  |
|---|---|---|---|---|
| 7,969,178 | B2 * | 6/2011 | Przybysz et al. | 326/5 |
| 8,111,083 | B1 * | 2/2012 | Pesetski et al. | 326/3 |
| 8,461,862 | B2 * | 6/2013 | Pesetski et al. | 326/3 |
| 8,508,280 | B2 * | 8/2013 | Naaman et al. | 327/367 |
| 2009/0015317 | A1 * | 1/2009 | DiVincenzo et al. | 327/528 |
| 2009/0102580 | A1 | 4/2009 | Uchaykin |  |
| 2010/0026447 | A1 | 2/2010 | Keefe et al. |  |
| 2010/0237899 | A1 | 9/2010 | Herr et al. |  |
| 2011/0133770 | A1 | 6/2011 | Przybysz et al. |  |
| 2011/0152104 | A1 | 6/2011 | Fairnelli et al. |  |
| 2011/0241765 | A1 * | 10/2011 | Pesetski et al. | 327/528 |

OTHER PUBLICATIONS

Deppe, et al.: "*Phase-Coherent Dynamics of a Superconducting Flux Qubit with Capacitive-Bias Readout*"; Sep. 19, 2008, retrieved Aug. 17, 2012 from the internet @ http://arxiv.org/pdf/0710.4455.pdf, pp. 2-3.
International Search Report for corresponding PCT/US12/44646, received Jan. 14, 2013.
D.V. Averin, K. Rabenstein, V.K. Semenov, "*Rapid Ballistic Readout for Flux Qubits*"; Physical Review B 73, 094504 (2006).
A. Fedorov, A. Shnirman, G. Schon, and A. Kidiyarova-Shevchenko, "*Reading Out the State of a Flux Qubit by Josephson Transmission Line Solitons*", Physical Review B 75, 224504 (2007).

(Continued)

*Primary Examiner* — William Hernandez
(74) *Attorney, Agent, or Firm* — Tarolli, Sundheim, Covell & Tummino LLP

(57) ABSTRACT

Methods and apparatuses are provided for controlling the state of a qubit. A qubit apparatus includes a qubit and a load coupled to the qubit through a filter. The filter has at least a first pass band and a first stop band. A qubit control is configured to tune the qubit to alter an associated transition frequency of the qubit from a first frequency in the first stop band of the filter to a second frequency in the first pass band of the filter.

20 Claims, 3 Drawing Sheets

(56) References Cited

OTHER PUBLICATIONS

M. Grajcar, S.H.W. van der Ploeg, A. Izmalkov, E. Ilichev, H.-G. Meyer, A. Fedorov, A. Shnirman, and G. Schon, "*Sisyphus Cooling and Amplification by a Superconducting Qubit*", Nature Physics 4, 612 (2008).

A. Herr, A. Fedorov, A. Shnirman, E. Ilichev, G. Schon, "*Design of a Ballistic Fluxon Qubit Readout*", Superconductor Science and Technology 20, S450 (2007).

M.D. Reed, B.R. Johnson, A.A. Houck, L. DiCarlo, L.M. Chow, D.I. Schuster, L. Frunzio, and R.J. Schoelkopf, "*Fast Reset and Suppressing Spontaneous Emission of a Superconducting Qubit*", Applied Physics Letters 96, 203110 (2010).

S.O. Valenzuela, W.D. Oliver, D.M. Berns, K.K. Berggren, L.S. Levitov and T.P. Orlando, "*Microwave-induced Cooling of a Superconducting Qubit*"; Science 314, 1589 (2006).

\* cited by examiner

CONTROLLING A STATE OF A QUBIT ASSEMBLY

TECHNICAL FIELD

The present invention relates generally to quantum computing systems, and more particularly to a managing a state of a qubit assembly.

BACKGROUND

A classical computer operates by processing binary bits of information that change state according to the laws of classical physics. These information bits can be modified by using simple logic gates such as AND and OR gates. The binary bits are physically created by a high or a low energy level occurring at the output of the logic gate to represent either a logical one (e.g., high voltage) or a logical zero (e.g., low voltage). A classical algorithm, such as one that multiplies two integers, can be decomposed into a long string of these simple logic gates. Like a classical computer, a quantum computer also has bits and gates. Instead of using logical ones and zeroes, a quantum bit ("qubit") uses quantum mechanics to occupy both possibilities simultaneously. This ability means that a quantum computer can solve a large class of problems with exponentially greater efficiency than that of a classical computer.

SUMMARY

In accordance with one aspect of the invention, a qubit apparatus includes a qubit and a load coupled to the qubit through a filter. The filter has at least a first pass band and a first stop band. A qubit control is configured to tune the qubit to alter an associated transition frequency of the qubit from a first frequency in the first stop band of the filter to a second frequency in the first pass band of the filter.

In accordance with another aspect of the invention, a method is provided for controlling an energy state of a qubit. The qubit is coupled to a resistive load through a filter. The filter has a pass band and a stop band. The qubit is tuned to alter an associated transition frequency of the qubit from a first frequency in the stop band of the filter to a second frequency in the pass band of the filter.

In accordance with a further aspect of the invention, a method is provided for resetting an energy state of a qubit. The qubit is coupled to a resistive load through a filter. The filter has a pass band and a stop band. A frequency of a transition between a ground state of the qubit and a first excited state of the qubit is tuned from a first frequency in the stop band of the filter to a second frequency in the pass band of the filter.

DETAILED DESCRIPTION

Solid state quantum bits ("qubits") encode information in quantized excitations of a macroscopic degree of freedom in objects such as semiconducting quantum dots, SQUIDs, or other superconducting devices. In any quantum computer, it is desirable to initialize the quantum bits to a known state with high fidelity. In some architectures, the physical qubits can be recycled throughout the computation, such that the application is sensitive to the speed of the reset operation. A solid state qubit, in accordance with an aspect of the present invention, has the ability to initialize the system in a known state with high fidelity, a process referred to herein as a "reset" of the qubit. In one implementation, the qubit is initialized in the ground state. A related process is the removal of unwanted thermal excitations from the qubit. In this process, referred to herein as "cooling" the qubit, the excited state population of the qubit is reduced to below thermal levels. The invention describes a fast reset or cooling scheme that involves coupling the qubit to a resistive load via a filter, such that the resistive load can be used selectively to reset or cool the qubit.

Figure 1:
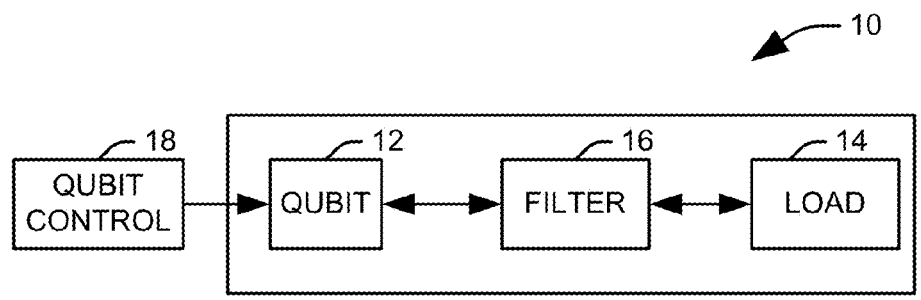
FIG. 1 illustrates a functional block diagram of a qubit assembly in accordance with an aspect of the present invention.

FIG. 1 illustrates a functional block diagram of a qubit assembly 10 in accordance with an aspect of the present invention. The qubit assembly 10 comprises a qubit 12 coupled to a load 14 via a filter assembly 16. The qubit 12 can include any physical assembly having a plurality of energy states that are tunable in response to a control mechanism 18. For example, the qubit cell can be implemented as an oscillator that can transfer energy between some combination of an electric field of a capacitor, a magnetic field of an inductor, and one or more superconducting Josephson junctions, such that the qubit cell can include one or more of a charge qubit, a flux qubit, and a phase qubit. Exemplary implementations of a qubit cell can include one or more of a Josephson junction, a quantum dot, a SQUID (superconducting quantum interference device), a Cooper pair box, and an ion trap. It will be further appreciated that the term "coupled" is intended to encompass not only a means of physical coupling, such as a mechanical coupling by means of an electrical conductor, but also any other appropriate coupling means including capacitive, inductive, magnetic, nuclear, and optical coupling, or any combination of the foregoing.

The filter assembly 16 can include any appropriate structure for selectively isolating the qubit 12 from the load 14 according to an associated resonant frequency of the qubit. The filter response can be realized as low pass, band pass or high pass such that the filter assembly 16 can have one or more associated pass bands and one or more associated stop bands. When the qubit is resonating at a frequency within a pass band of the filter assembly 16, the qubit sees the impedance of the load, and a fast reset can occur with a time constant $T_1 = RC$ where C is the qubit capacitance and R is the real part of the load impedance seen from the input of the filter. When the qubit is resonating at a frequency within a stop band of the filter assembly 16, the filter assembly transforms the load impedance to either a short or an open, depending on the filter topology, effectively decoupling the qubit 12 from the load. It will be appreciated that the load 14 can be selected to have a real impedance that matches the LC characteristics of the filter assembly. For example, the load 14 can be a resistive load having a resistance selected to match an impedance of the filter assembly 16.

It will be appreciated that the qubit 12 can be tuned by the control mechanism 18 to change associated transition frequencies of the energy states of the qubit 12. For example, the control mechanism 18 can be configured provide a bias current or flux to the qubit 12, and the qubit can be tuned by altering the bias current or flux provided from the control mechanism. Accordingly, the qubit frequency can be tuned to move state transition frequencies between the stop bands and pass bands of the filter assembly to selectively expose one or more inter-level transition frequencies of the qubit to the load. For example, a transition frequency between a ground state and a first excited state can be tuned into a pass band of the filter assembly 16 to cause a reset of the qubit. Alternatively, a transition frequency between a ground state and a second excited state can be tuned into a pass band of the filter assembly 16 to allow for a cooling of the qubit. To facilitate cooling of the qubit, the qubit control can be configured to provide microwave pulses to drive the qubit at a transition frequency between the first and second excited states. In one implementation, a multi-section filter is used to ensure that the roll-off characteristics of the filter assembly 16 are sufficiently sharp to fit within the tunability range of the qubit 12.

In one implementation, the load 14 can comprise a circuit element that receives the quanta of energy stored in the qubit 12 when the excited states of the qubit are tuned into a pass band of the filter assembly 16. Essentially the qubit control 18 can tune the qubit 12 to discharge its associated quantum state along the filter assembly 16 to provide it to the circuit element. In such a case, the load 14 can comprise any element having a non vanishing real impedance to which it is desirable to provide a single photon input. For example, said circuit element can be an amplifier, a detector, a fiber coupler, an opto-modulator, a beam splitter, or similar component. It will further be appreciated that the qubit assembly 10 can be used with resonators, other qubits, or other qubit assemblies having the fast cooling and reset configuration of the illustrated qubit assembly.

Figure 2:
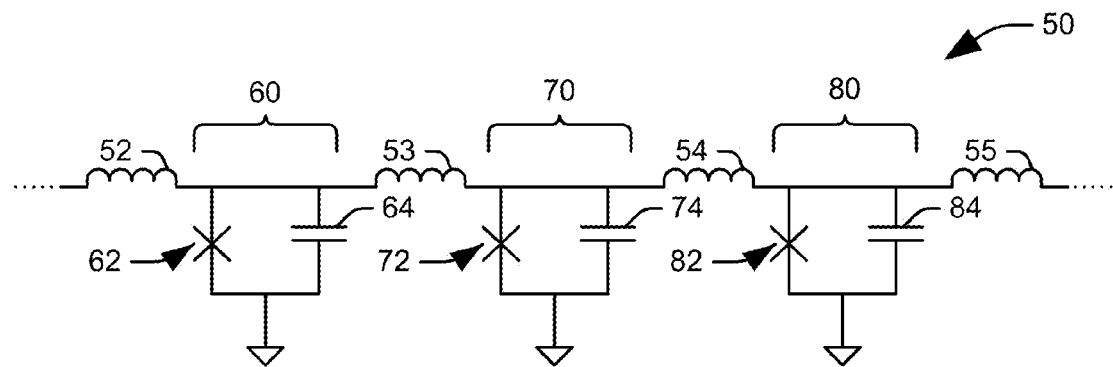
FIG. 2 illustrates one implementation of a filter assembly in accordance with an aspect of the present invention as a Josephson transmission line.

FIG. 2 illustrates one implementation of a filter assembly 50 in accordance with an aspect of the present invention as a Josephson transmission line. The Josephson transmission line is a transmission line that does not support propagating small-amplitude modes below an associated junction plasma frequency, and therefore can provide isolation between a qubit and a resistive load for energy states in the qubit having transition frequencies to ground smaller than the JTL plasma frequency. At frequencies higher than the plasma frequency, the Josephson transmission line supports propagating modes, referred to as plasmons, and can efficiently couple any states in the qubit having transition frequencies greater than the plasma frequency to a matched load and facilitate fast reset or cooling.

The Josephson transmission line comprising a plurality of cells 60, 70, and 80 connected by series inductors 52-55. Each cell 60, 70, and 80 contains a Josephson junction 62, 72, and 82 shunted to ground through an associated capacitor 64, 74, and 84. The plasma frequency of the Josephson transmission line is defined by a critical current, $i_0$, for the Josephson junctions 62, 72, and 82 associated with each cell 60, 70, and 80 and a capacitance associated the shunt capacitors 64, 74, and 84. The series inductors 52-55 coupling the individual cells 60, 70, and 80 can have an inductance less than an associated inductance, $L_j$, of the Josephson junctions 62, 72, and 82, where $L_j = \hbar/2ei_0$, where $\hbar$ is the reduced Planck constant (h/2π) and e is the elementary charge. In practice, the inductance of the series inductors 52-55 can be selected to be approximately one-third to one tenth of the inductance of the Josephson junctions. The resulting Josephson transmission line provides a compact structure that is both compatible with the low temperature operation desirable for quantum computing and capable of co-fabrication with a qubit using the same processing technology.

Figure 3:
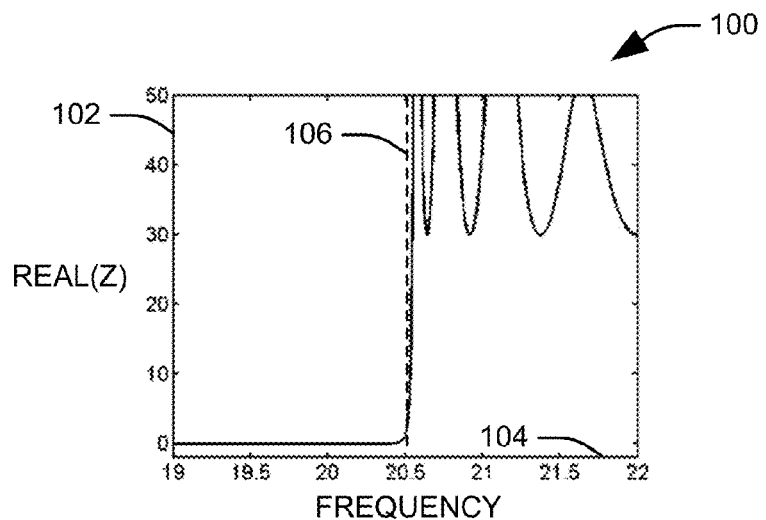
FIG. 3 is a chart illustrating a real part of an input impedance of one implementation of the invention using a Josephson transmission line.

In one implementation, the Josephson junctions 62, 72, and 82 can have critical currents, $i_0$=1 μA and a plasma frequency of $\omega_p/2\pi$=20.5 GHz set by selecting the shunting capacitors 64, 74, and 84 for each junction as a 0.2 pF capacitor. The series inductors 52-55 are selected to have an inductance of 30 pH. In one example, the Josephson transmission line can be configured with one hundred cells, and a total length on the order of several millimeters, although it will be appreciated that the transmission line can be longer or shorter depending on the specific application. FIG. 3 is a chart 100 illustrating the real part of an input impedance of this transmission line, represented by a vertical axis 102 of the chart, as a function of frequency, represented by a horizontal axis 104. As can be seen from the chart, such that the Josephson transmission line appears as a reactive short (Re{Z}=0) below the plasma frequency 106, but has a finite dissipative component (Re{Z}>0) above the plasma frequency. The oscillatory behavior of the real portion of the impedance above the plasma frequency 106 is a result of the finite length of the Josephson transmission line.

Figure 4:
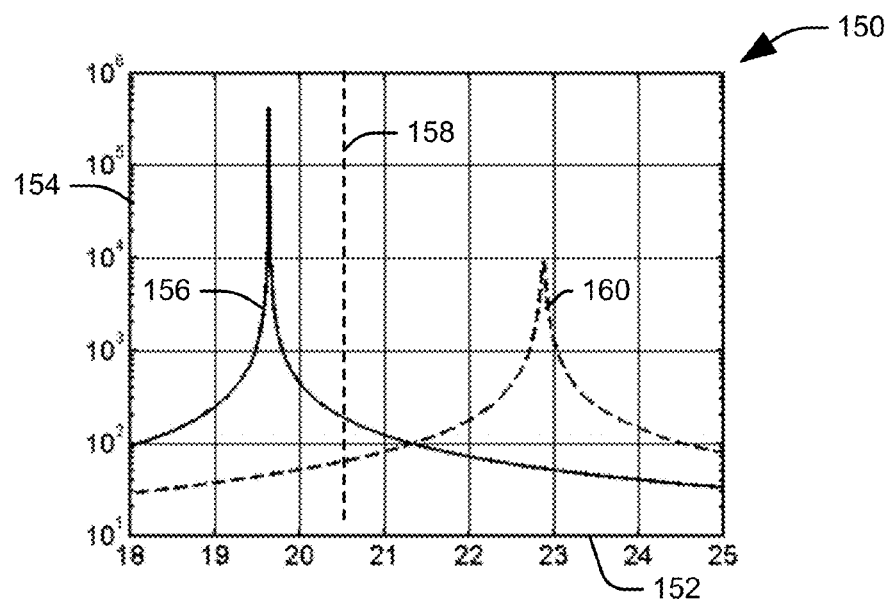
FIG. 4 illustrates a simulation of the damping experienced by a qubit coupled to a resistive load through a Josephson transmission line in one implementation of the qubit assembly.

FIG. 4 illustrates a simulation of the damping experienced by a qubit coupled to a resistive load through the Josephson transmission line modeled in FIG. 3 as a chart 150 of the impedance of the qubit at various frequencies. Specifically, FIG. 4 demonstrates the frequency selective damping of a simulated phase qubit coupled inductively to the Josephson junction. The simulated phase qubit is comprised of a Josephson junction shunted by a 0.5 pF capacitor and enclosed in a loop with an inductance of 300 pH. A 500 kiloOhm shunt resistor is also included in the simulation to account for internal losses in the qubit. A resonant frequency of the qubit is represented in gigahertz on the horizontal axis 152 and a magnitude of the impedance of the qubit is represented logarithmically on the vertical axis 154. A first graph, shown as a solid line, represents the impedance 156 for a first qubit frequency, below the plasma frequency 158 of the Josephson transmission line. A second graph, shown as a dashed line, represents the impedance 160 for a second qubit frequency which is above the plasma frequency of the Josephson transmission line.

At the lower frequency 156, the qubit lifetime is limited by internal losses, and the impedance grows to the value of the modeled shunt resistor on resonance. Once the frequency of the qubit exceeds the plasma frequency 158, the qubit lifetime is dominated by the impedance of the resistive load, as transformed by the efficiency of the inductive coupling to the qubit. Accordingly, the qubit quality factor can be reduced by more than an order of magnitude by tuning its frequency to a frequency above the cut-off frequency of the Josephson transmission line. This reduction in quality factor directly implies a reduction in qubit lifetime by a similar factor. Therefore, by tuning the qubit frequency above the Josephson transmission line cutoff, a fast decay of the qubit to its ground state can be induced.

In the simulation of FIG. 4, the Josephson junctions in the Josephson transmission line are modeled as linear inductances. This approximation, which neglects the nonlinearity of the Josephson junctions, is justified given the low power level associated with the propagation of a single photon. In fact, a Josephson transmission line suitable for use in facilitating fast reset and cooling of qubits could be made entirely with linear elements, replacing the Josephson junctions by linear inductors. Josephson junctions are used in the example of FIG. 2, however, because they can currently be fabricated with smaller physical dimensions than linear inductors of similar values.

Figure 5:
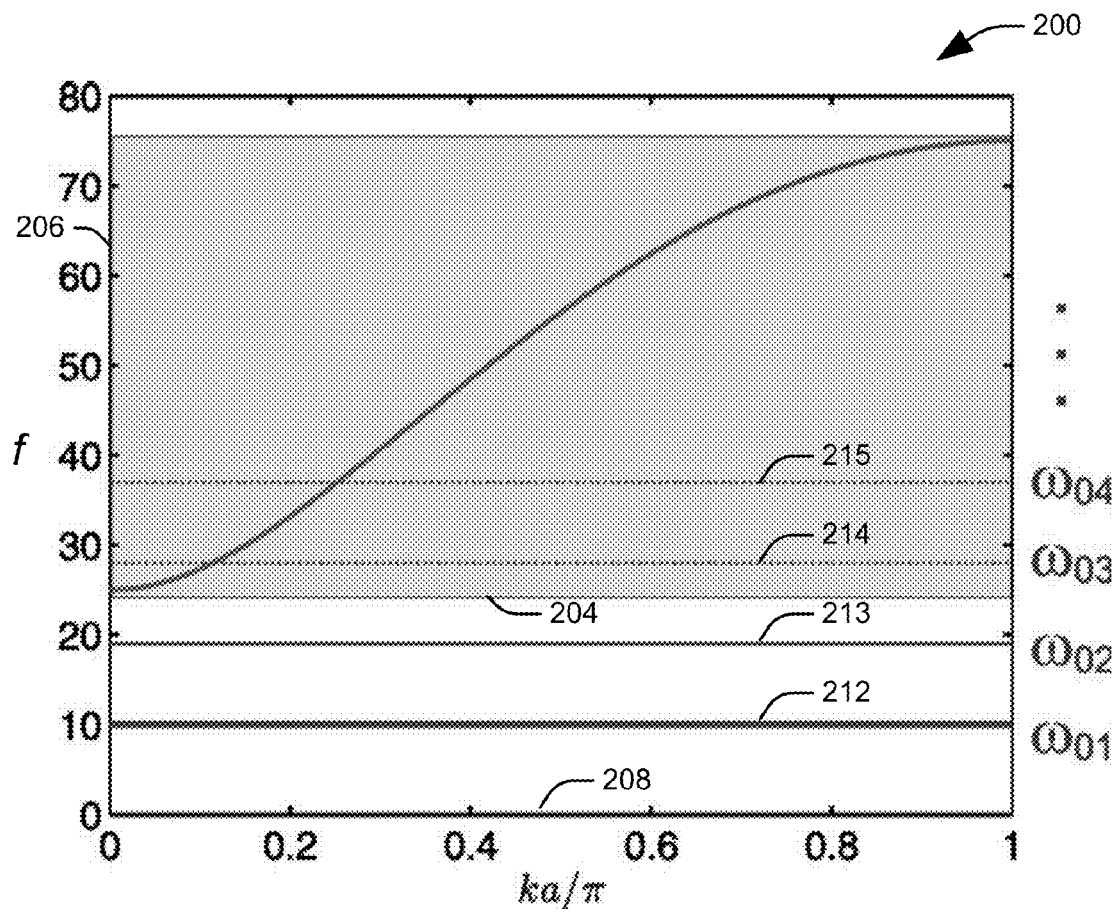
FIG. 5 illustrates a chart of a dispersion relation for the plasmon modes of one example of filter assembly configured to operate as a high pass filter having a cutoff frequency of twenty-five gigahertz.

FIG. 5 illustrates a chart 200 of a dispersion relation 202 for the plasmon modes of one example of filter assembly in accordance with an aspect of the present invention, configured to operate as a high pass filter having a cutoff frequency 204 of twenty-five gigahertz. In the illustrated chart, the vertical axis 206 represents frequency, f, in gigahertz, while the horizontal axis 208 represents the wavenumber, k, of the propagating mode, multiplied by a characteristic length, a, of the filter assembly to produce a unitless constant. For example, for a Josephson transmission line arrangement, the characteristic length of the filter assembly can include a physical length of each cell in the Josephson transmission line. This unitless constant is scaled by pi to produce a scale from zero to one along the horizontal axis 208.

Overlaid with the dispersion curve is a schematic of a qubit energy spectrum 212-215. As illustrated in FIG. 5, both first and second excited states 212 and 213 are protected from radiating their energy into the load by the low-frequency cutoff of the filter. In addition, they are protected from low frequency fluctuations in the load, which helps preserves the qubit phase coherence. Higher levels of the qubit, such as the third and fourth excited states 214 and 215, lie above the cut-off frequency of the filter assembly, such that energy can be drawn away via a plasmon mode and dissipate the energy at a the resistive load.

Figure 6:
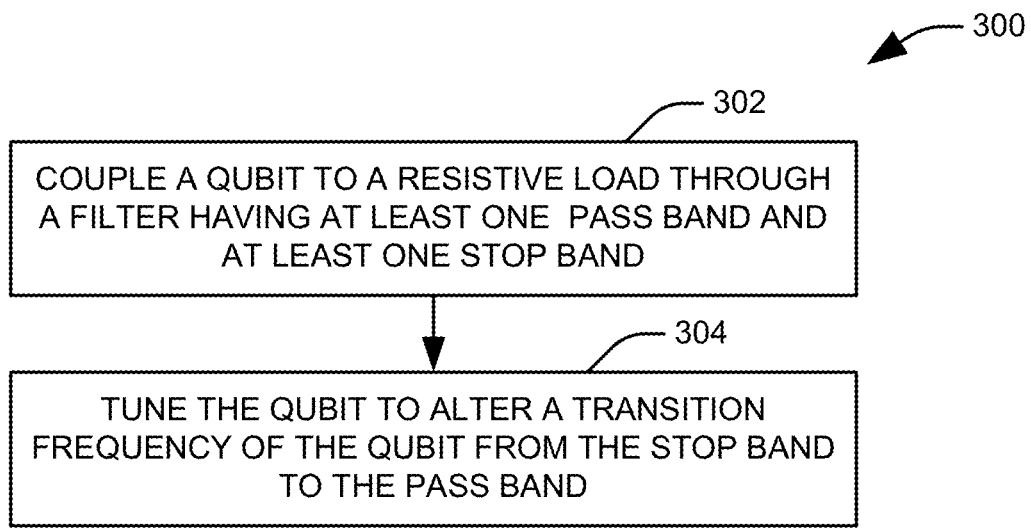
FIG. 6 illustrates a method for managing an energy state of a qubit in accordance with an aspect of the present invention.

FIG. 6 illustrates a method 300 for managing an energy state of a qubit in accordance with an aspect of the present invention. At 302, the qubit is coupled to a load through a filter. The filter is configured to have at least one pass band, representing frequencies at which energy within the qubit can freely pass to the resistive load, and at least one stop band, representing frequencies at which the qubit is substantially isolated from the resistive load. In one implementation, the qubit is coupled to a resistive load via a Josephson transmission line. In another implementation, the load includes a circuit element or a sub-circuit having an impedance with a non-vanishing real part.

At 304, the qubit is tuned to alter an associated transition frequency of the qubit from a first frequency in the stop band of the filter to a second frequency in the pass band of the filter. For example, a frequency of a transition between a ground state of the qubit and a second excited state of the qubit can be tuned from the first frequency to the second frequency. The qubit can then be driven, for example, via microwave pulses at a frequency associated with a transition between a first excited state of the qubit and the second excited state of the qubit to cool the qubit to the ground state. Alternatively, a frequency of a transition between a ground state of the qubit and a first excited state of the qubit from the first frequency to the second frequency to reset the qubit. In one implementation, in which the qubit is coupled to a circuit element via the filter, tuning the qubit to provide the reset also provides an associated quantum state of the qubit to the circuit element via the filter. Once the qubit has been reset to its ground state, the qubit can be tuned back to the original frequencies and one or more quantum gate operations can be performed on the qubit.

Figure 7:
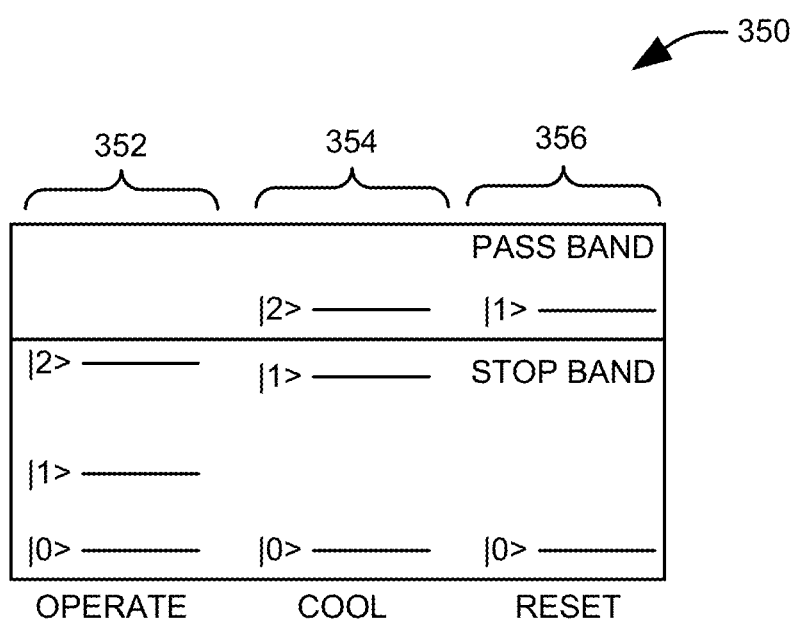
FIG. 7 is a schematic diagram illustrating three modes of operation of one example of a qubit assembly in accordance with an aspect of the present invention.

FIG. 7 is a schematic diagram 350 illustrating three modes of operation of one example of a qubit assembly in accordance with an aspect of the present invention. In a first mode of operation 352, the qubit states are tuned to appropriate frequencies for operation. Accordingly, each of the first excited state, $|1\rangle$, and the second excited state, $|2\rangle$, have respective associated transition frequencies with the ground state, $|0\rangle$, that are below a cut-off value of the filter. In other words, the qubit is tuned such that both the first excited state and the second excited state have transition frequencies to the ground state that fall within the stop band of the filter. When the qubit is in this state, quantum gate operations can be performed on the qubit to modify the state of the qubit or another qubit.

In a second mode of operation 354, the qubit states are tuned such that the qubit can be cooled to remove unwanted thermal excitation. To this end, the qubit can be tuned such the transition frequency between the first excited state and the ground state is within the stop band, but the transition frequency between the second excited state and the ground state is within the pass band of the filter. The qubit can then be driven at a frequency associated with a transition between the first excited state and the second excited state to allow the thermal energy to be dissipated through the filter at the load. For example, the qubit can be driven with pulses of microwave flux at the transition frequency.

In a third mode of operation 356, the qubit states are tuned to force a fast reset of the qubit. Specifically, the qubit can be tuned such the transition frequency between the first excited state and the ground state is within the pass band, allowing any portion of the quantum state associated with the first excited state to dissipate though the filter and forcing an associated amplitude of the first excited state to zero. Once the qubit has been reset to ground, it can be restored to the first mode of operation 352 to allow for the performance of quantum gate operations.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A qubit apparatus comprising:
a qubit;
a load coupled to the qubit through a filter, the filter having at least a first pass band and a first stop band; and
a qubit control configured to tune the qubit to alter an associated transition frequency of the qubit from a first frequency in the first stop band of the filter to a second frequency in the first pass band of the filter.

2. The apparatus of claim 1, the filter comprising a Josephson transmission line comprising a plurality of cells.

3. The apparatus of claim 2, each of the plurality of cells comprising a capacitively-shunted Josephson junction, the Josephson junction having an associated critical current.

4. The apparatus of claim 3, the plurality of cells being coupled to one another by inductors having associated inductances less than an inductance associated with the Josephson junction associated with each cell.

5. The apparatus of claim 4, wherein an associated inductance of the Josephson junctions associated with the plurality of cells is between three and ten times an inductance associated with the inductors coupling the plurality of cells.

6. The apparatus of claim 1, wherein the qubit control is configured to provide a bias current to the qubit, the qubit control tuning the qubit by altering the provided bias current.

7. The apparatus of claim 1, wherein the qubit control is configured to provide microwave pulses to drive the qubit at a desired frequency.

8. The apparatus of claim 1, wherein the qubit is a phase qubit.

9. The apparatus of claim 1, wherein the load is a resistive load.

10. The apparatus of claim 1, wherein the load is a circuit element having an impedance with a non-vanishing real part, the qubit control being configured to tune the qubit to provide an associated quantum state of the qubit to the circuit element via the filter.

11. A method for controlling an energy state of a qubit comprising:
 coupling a qubit to a resistive load through a filter, the filter having a pass band and a stop band; and
 tuning the qubit to alter an associated transition frequency of the qubit from a first frequency in the stop band of the filter to a second frequency in the pass band of the filter.

12. The method of claim 11, wherein tuning the qubit to alter the associated transition frequency of the qubit comprises tuning a frequency of a transition between a ground state of the qubit and a second excited state of the qubit from the first frequency to the second frequency.

13. The method of claim 12, further comprising driving the qubit at a frequency associated with a transition between a first excited state of the qubit and the second excited state of the qubit to cool the qubit to the ground state.

14. The method of claim 11, wherein tuning the qubit to alter the associated transition frequency of the qubit comprises tuning a frequency of a transition between a ground state of the qubit and a first excited state of the qubit from the first frequency to the second frequency to reset the qubit.

15. The method of claim 14, further comprising tuning the frequency of the transition between the ground state of the qubit and the first excited state of the qubit from the second frequency to the first frequency and performing a gate operation on the qubit.

16. The method of claim 11, wherein coupling the qubit to a resistive load through a filter comprises coupling the qubit to a resistive load through a Josephson transmission line.

17. A method for resetting an energy state of a qubit comprising:
 coupling the qubit to a load through a filter, the filter having a pass band and a stop band; and
 tuning a frequency of a transition between a ground state of the qubit and a first excited state of the qubit from a first frequency in the stop band of the filter to a second frequency in the pass band of the filter.

18. The method of claim 17, further comprising tuning the frequency of the transition between the ground state of the qubit and the first excited state of the qubit from the second frequency to the first frequency and performing a gate operation on the qubit.

19. The method of claim 17, wherein coupling the qubit to a load through a filter comprises coupling the qubit to a circuit element having an impedance with a non-vanishing real part, such that tuning the frequency of the transition between the ground state of the qubit and the first excited state of the qubit comprises providing an associated quantum state of the qubit to the circuit element via the filter.

20. The method of claim 17, wherein coupling the qubit to a load through a filter comprises coupling the qubit to a resistive load through a Josephson transmission line.

* * * * *